Patented Mar. 31, 1936

2,035,504

UNITED STATES PATENT OFFICE 2,035,504

TREATMENT OF ARTIFICIAL MATERIALS

Reginald Henry Parkinson and Charles Wesley Addy, Spondon, near Derby, England, assignor to Celanese Corporation of America, a corporation of Delaware No Drawing. Application September 30, 1932, Serial No. 635,599. In Great Britain October 31, 1931

6 Claims. (Cl. 28—1)

This invention is a continuation in part of U. S. application S. No. 488,998 filed 15th October, 1930 and relates to improvements in the treatment of artificial materials and more especially to the manufacture of filaments, threads, yarns, ribbons, films, fabrics or other materials of cellulose acetate or other cellulose derivatives having a reduced, subdued or modified lustre.

In U. S. application S. No. 488,998 processes are described for reducing the lustre of materials made of or containing cellulose esters or ethers by applying thereto dispersions or colloidal solutions of white or substantially white inorganic substances, for example oxides of aluminium, titanium, tin, silicon, zinc, cerium, etc., barium carbonate, barium sulphate, china clay, bentonite and the like. Though the invention of the said specification is described quite broadly in relation to dispersions of such substantially white inorganic substances, the dispersions therein described are more particularly dispersions which have an acid reaction.

We have now found that very much improved results are obtained by employing dispersions which are somewhat alkaline in character. We find that the use of such dispersions considerably facilitates the subsequent scouring of the materials. The alkalinity of the dispersions should not be sufficient to produce any deleterious effect upon the cellulose derivative, and especially a deleterious degree of saponification in the case of cellulose esters. However, it is found that comparatively stable dispersions may readily be obtained within these limits.

As described in U. S. application S. No. 488,998 the absorption of the dispersed substantially white inorganic solid may be enhanced by treating the materials before or during their application with swelling agents for the cellulose ester or ether. Such swelling agents are for example acetone, acetic acid, lactic acid, formic acid, phenols, methyl acetate, ethyl acetate, alcohols, and the ethers, esters and ether-esters of glycols and other polyhydric alcohols, for instance dioxane, glycol mono-acetate, methyl glycol mono-acetate, triacetin and the like.

The agent for rendering the dispersion of the solid material alkaline may itself be the agent which peptizes the solid or maintains its dispersed state. We particularly prefer to employ relatively weak alkaline substances, and in this category we may instance the various soaps, for instance sodium, potassium or ammonium soaps, ethanolamine soaps, or other organic soaps, ammonia, borax, and sodium and potassium carbonates. Alternatively, the dispersion may be rendered alkaline by an agent which is not itself the dispersing agent.

For example, titanium dioxide may be dispersed by grinding in the presence of a small quantity of ammonia and may be employed to give a suitable dispersion in the presence of soap and/or a swelling agent. Such a dispersion may, for example, be used upon the cellulose acetate fabrics at temperatures up to about 40° C.

Constituents of the dispersion should, of course, be compatible with each other. Thus, for instance, swelling agents which precipitate the dispersing agents should not be used, and similarly two dispersing agents which precipitate each other or an alkaline reagent which precipitates a dispersing agent should be avoided.

The methods of application, methods by which absorption may be increased and the materials to which the invention is applicable are similar to those described in relation to U. S. application S. No. 488,998, and reference is made to the specification for details thereof.

The following example illustrates the invention, but it is not to be considered as limiting it in any way:—

Example

Very finely divided hydrated titanium oxide is made up in the form of a 38% aqueous paste. Using this paste as base, the following bath is prepared:—

| | Parts |
|---|---|
| 38% TiO$_2$ paste | 100 |
| Water | 400 |
| Acetone | 100 |
| Soap | 1 |

A cellulose acetate fabric is paddled in the bath for half an hour at 50° C. and is then well washed. By this means the titanium oxide may be intimately incorporated throughout the cross-section of the individual filaments.

What we claim and desire to secure by Letters Patent is:—

1. Process for permanently delustering textile materials, containing organic derivatives of cellulose, without the aid of a fixing agent which comprises causing the materials to absorb a substantially white insoluble inorganic substance from an aqueous dispersion thereof which is alkaline owing to the presence of a soap, said absorption being effected at a temperature below that at which a simple aqueous soap solution will cause delustering.

2. Process for permanently delustering textile materials, containing organic derivatives of cellulose, without the aid of a fixing agent which comprises causing the materials to absorb a substantially white insoluble inorganic substance from an aqueous dispersion thereof which is alkaline owing to the presence of a soap, which dispersion contains a swelling agent, said absorption being effected at a temperature below that at which a simple aqueous soap solution will cause delustering.

3. Process for permanently delustering textile materials, containing organic derivatives of cellulose, without the aid of a fixing agent which comprises causing the materials to absorb a substantially white insoluble inorganic substance from an aqueous dispersion thereof which is alkaline owing to the presence of a soap, said absorption being effected at a temperature below 50° C.

4. Process for permanently delustering textile materials, containing cellulose acetate, without the aid of a fixing agent which comprises causing the materials to absorb a substantially white insoluble inorganic substance from an aqueous dispersion thereof which is alkaline owing to the presence of a soap, said absorption being effected at a temperature below that at which a simple aqueous soap solution will cause delustering.

5. Process for permanently delustering textile materials, containing cellulose acetate, without the aid of a fixing agent which comprises causing the materials to absorb a substantially white insoluble inorganic substance from an aqueous dispersion thereof which is alkaline owing to the presence of a soap and contains a swelling agent, said absorption being effected at a temperature below that at which a simple aqueous soap solution will cause delustering.

6. Process for permanently delustering textile materials, containing cellulose acetate, without the aid of a fixing agent which comprises causing the materials to absorb a substantially white insoluble inorganic substance from an aqueous dispersion thereof which is alkaline owing to the presence of a soap, said absorption being effected at a temperature below 50° C.

REGINALD HENRY PARKINSON.
CHARLES WESLEY ADDY.